United States Patent [19]

Johnson et al.

[11] Patent Number: 4,472,537

[45] Date of Patent: Sep. 18, 1984

[54] THERMOPLASTIC INKS FOR DECORATING PURPOSES

[75] Inventors: Ronald E. Johnson, Tioga, Pa.; Lung-ming Wu, Horseheads, N.Y.

[73] Assignee: Corning Glass Works, Corning, N.Y.

[21] Appl. No.: 525,123

[22] Filed: Aug. 22, 1983

Related U.S. Application Data

[63] Continuation of Ser. No. 419,196, Sep. 17, 1982, abandoned, which is a continuation-in-part of Ser. No. 365,395, Apr. 5, 1982, abandoned, which is a continuation-in-part of Ser. No. 202,648, Oct. 31, 1980, abandoned.

[51] Int. Cl.³ .............................................. C08K 3/40
[52] U.S. Cl. .................................. 523/160; 524/272; 524/274; 524/292; 524/308
[58] Field of Search ............... 523/160; 524/272, 274, 524/292, 296, 297, 308

[56] References Cited

U.S. PATENT DOCUMENTS 4,280,939 7/1981 Johnson ...................... 260/23 AR

Primary Examiner—Paul R. Michl
Attorney, Agent, or Firm—C. S. Janes, Jr.

[57] ABSTRACT

There are disclosed thermoplastic inks in the nature of high viscosity, tacky pastes which exhibit high cohesive strength, high pressure sensitivity at low temperatures, high thermal stability and low affinity for silicone surfaces. These properties make the inks particularly useful in those printing processes involving multiple elastomeric transfer members, in particular, those processes wherein silicone transfer members print successive colors onto a silicone collector which in turn transfers the multicolored print in a single step to ware or decal paper. The ink formulations consist essentially, in weight percent, of:

(a) 50–80% of a pigmented, vitreous, inorganic flux;
(b) 2–20% of a selected organic polymer;
(c) 5–25% of a selected plasticizer;
(d) 2–20% of a selected amorphous tackifying resin; and optionally,
(e) up to 20% of an organic wax.

12 Claims, No Drawings

THERMOPLASTIC INKS FOR DECORATING PURPOSES

This is a continuation of application Ser. No. 419,196, filed Sept. 17, 1982 now abandoned, which application is a continuation-in-part of Ser. No. 365,395, filed Apr. 5, 1982, and now abandoned which is a continuation-in-part of Ser. No. 202,648, filed Oct. 31, 1980, and now abandoned.

BACKGROUND OF THE INVENTION

Commercially available, thermoplastic (hot melt) inks are recognized as a means of producing high quality decorations on glass, glass-ceramic and ceramic articles. Such an ink generally exhibits wax-like characteristics with a low melt viscosity, typically less than 150 poises, at its application temperature. The surface becomes tack-free when cooled to a significant extent below the ink softening (melt) point.

The term "thermoplastic" customarily signifies a material that reversibly softens under the influence of heat. When employed with inks, however, it further signifies melt processibility, that is, the capability of being applied in the molten state to a surface. In some cases, thermoplastic materials may be applied from solution. When so used, they are often termed "lacquers". To avoid ambiguity, thermoplastic inks which are melt processible are often referred to as "hot melt inks".

Thermoplastic inks used in decorating and/or printing generally consist of a vitrifiable, inorganic material dispersed in an organic, flowable vehicle or binder. The inorganic material normally is a clear glass base (flux) containing a pigment and/or an opacifier. Such inorganic materials have been marketed for many years as complete vitrifiable or ceramic colors for use in decorating glass and ceramic ware. The user disperses the inorganic colorant in a vehicle prior to use.

Typically, inks suitable for decorating glass, glass-ceramic, or ceramic surfaces are filled with inorganic material (glass flux, pigments, and opacifiers) in an amount totalling 60–90% by weight. After subsequent application to a surface, such an ink is fired at an elevated temperature, generally in excess of 500° C., to burn out the organics and melt the glass flux. The organics employed must, then, be capable of removal below the firing temperature without affecting the visual appearance and performance of the decoration. Materials employed have included waxes, such as fatty alcohols, polyethylene glycol, and polyethylene glycol esters. The ink is further fortified with a resin that imparts cohesive strength or modifies viscosity, such as ethyl cellulose, hydroxypropyl cellulose, and butyl methacrylate.

Prior thermoplastic inks have commonly been applied by screening methods. These have involved either direct application or offset screening, as disclosed in U.S. Pat. No. 3,688,695. Available ink compositions, as described above, were satisfactory for screening, but not for other techniques. In particular, they were unsuitable for many of the techniques using elastomeric transfer (offset) operations. Such an operation is disclosed in U.S. Pat. No. 3,756,165, and employs oil-based or solvent-based inks.

In glass decorating, a particular problem arose during drying of the oil-based or solvent-based inks to a tacky, semi-solid state upon an elastomer surface prior to transfer onto an article surface. It was observed that an even greater viscosity change was needed to be achieved on the elastomer surface when printing onto a non-porous glassy surface than when printing onto a porous surface, such as unglazed china or wood. The problem was aggravated by the need to use a high level of organic solvent to compensate for the effect of the glass fluxes and pigments on initial ink viscosity. If the organic solvent evaporated slowly, the process was time consuming; it if evaporated rapidly, there were viscosity stability problems. See U.S. Pat. No. 3,756,165, supra.

The viscosity problem could be alleviated with thermoplastic inks, but available formulations lacked pressure sensitivity at temperatures much below their softening points. Thus, it was necessary to heat the inks to temperatures near their softening points during transfer. See U.S. Pat. No. 3,688,695, supra.

An alternative decorating technique involves application of decalcomania transfers (decals) to the surface being decorated followed by firing to permanently affix the decoration to the surface. In this technique, the decoration or design, embodying the inorganic colorant(s), is formed independent of the surface to be decorated, usually on a transfer paper or other carrier. Subsequently, the decal is transferred to the surface, temporarily adhered by an adhesive layer, and then thermally fused onto the surface with burnout of the organics. The three main types of decals are: water-release, heat-release and pressure-release.

RELATED PATENTS AND APPLICATION

U.S. Pat. No. 4,261,749 discloses a family of thermoplastic inks which are described as ultra-high viscosity, tacky pastes at room temperature. These inks are disclosed as being particularly useful in offset type processes wherein a silicone elastomer is employed to transfer a decoration between a heated gravure or screen surface and the surface of ware being decorated, or of a decal paper or other carrier.

A single ink may be transferred directly to a ware surface or a decal carrier. However, the inks are described as being especially adapted to a double offset process wherein an ink is transferred to a second silicone member known as a collector. A multicolor print may be formed on this collector by successive transfers. The print thus collected may then be transferred intact to either the ware surface, or to a decal carrier for storage. This type of multi-transfer operation is disclosed, for example, in pending U.S. application Ser. No. 173,129, entitled *Article Decorating* and filed jointly by C. E. Ford and R. E. Johnson July 28, 1980, now U.S. Pat. No. 4,445,432.

The inks disclosed in U.S. Pat. No. 4,261,749 consist essentially of, in weight percent, (a) 50–80% of a vitrifiable inorganic flux containing up to 40% inorganic pigments and opacifiers, (b) 5–25% of a polyoxyalkylene ether having a molecular weight between 200 and 10,000, (c) 2–20% of a water soluble, cohesive strength imparting polymer having a molecular weight between 25,000 and 500,000 (preferably polyvinyl pyrrolidone), and (d) 0–20% of a compatible modifying wax and/or plasticizer selected from certain polyoxyalkylene ether waxes and ester waxes that have softening (melt) points below 65° C.

U.S. Pat. No. 4,280,939 discloses a family of thermoplastic inks which are described as tacky solids that exhibit permanent pressure sensitivity far below their melt points. These inks are disclosed as being useful in preparing pressure-release or heat-release decals via offset or flexographic processes, or in direct printing where a collector elastomer is used in producing multicolor prints. The decal production process is disclosed in U.S. Pat. No. 4,292,104.

The compositions of U.S. Pat. No. 4,280,939 consist essentially of, in percent by weight, (a) 50-80% of a vitrifiable, inorganic flux containing up to 30% inorganic pigments and opacifiers, (b) 2-20% of an ethylene-ester copolymer resin having 8-40% of a copolymerized ester selected from vinyl alcohol esters of $C_1$-$C_4$ saturated monocarboxylic acids and $C_1$-$C_5$ saturated alcohol esters of acrylic or methacrylic acid, (c) 4-20% of a selected amorphous tackifying resin, (d) 0-10% of a modifying polyolefin resin selected from certain low molecular weight polyethylene resins and amorphous polypropylene resins, and (e) 5-25% of a compatible organic wax and/or plasticizer having a Ring and Ball softening point below 100° C.

These related patents and application, and the materials disclosed therein, are thought to represent the most relevant knowledge prior to the present invention. They are incorporated by reference, in their entireties, for their disclosure of materials and processes relevant to the present invention.

GENERAL DISCUSSION OF THE PROBLEM

Extensive investigation and evaluation of the collector or double offset process has led to the conclusion that to provide satisfactory performance the ink must demonstrate certain physical and chemical characteristics. First, the ink should be a hot melt material with no solvents which will volatilize at process operation temperatures, thereby insuring that the viscosity of the ink remains essentially constant for a prescribed process temperature throughout the process operation period. Second, the constituents of the ink should be carefully chosen to avoid any substantial migration thereof into or any significant attack of the offset transfer surfaces (commonly silicone elastomers) during the process operation. Third, the ink must exhibit specific tack (pressure sensitivity), cohesive strength, and viscosity characteristics which permit it to be initially deposited upon an offset transfer surface with high print fidelity, and thereafter to be faithfully and completely transferred as an integral film throughout the remaining transfer steps of the collector process.

Former attempts to develop a satisfactory double offset process, an example of which is disclosed in U.S. Pat. No. 3,915,087, were only partially successful because of limitations imposed by the inherent nature of the ink materials employed. Inasmuch as the collector process requires the ink to undergo a substantial increase in viscosity between deposition upon the first offset surface and the subsequent transfer therefrom, the prior disclosure effected that increase through the loss of solvent from the ink formulation by evaporation and/or by absorption into the transfer surface. As would be expected, solvent volatilization caused substantial viscosity stability problems and restricted process printing speeds to offset and/or minimize the adverse effect of solvent volatilization. On the other hand, solvent absorption into the collector surface led to localized swelling of the transfer surface and saturation of the surface with the solvent.

Those problems were of such magnitude as to preclude the double offset process from becoming a reliable production technique for printing of high quality decorations. Moreover, those problems were additionally compounded for decorating ceramic bodies because of further composition limitations imposed by the necessary inclusion of high levels of ceramic pigments and fluxes into the basic ink formulations.

OBJECTIVES OF THE INVENTION

The basic objective is to provide a family of thermoplastic inks in the nature of tacky pastes which possess an unusual set of properties especially suited for decorating glass, glass-ceramic and ceramic surfaces. One particular objective is to provide such inks which combine extraordinary cohesive strength with moderate viscosity at application or printing temperature. Another objective is to provide inks that possess good thermal stability up to and at printing temperature. A further objective is to provide inks having a very high pressure sensitivity at transfer temperatures and low affinity for silicone surfaces. A still further purpose is to provide inks that can be released from high surface energy silicones at lower contact pressures than most available thermoplastic inks. Yet another objective is to provide thermoplastic inks in which the deteriorating effect on silicone or other elastomeric transfer surfaces during operation is minimized.

A practical objective is to provide improved thermoplastic inks for use in offset printing processes using multiple, consecutive, silicone members for ink transfer, as well as in processes wherein the pressure required for ink transfer is exerted by a low durometer elastomeric pad. A further practical objective is to provide thermoplastic inks that exhibit permanent pressure sensitivity so that they may either be transferred from a silicone or other elastomeric-coated surface immediately, or stored for later transfer. A still further objective is to provide thermoplastic inks that are adapted to decorating glass, glass-ceramic and ceramic surfaces, and that have properties for such purpose that are superior to those possessed by inks disclosed in U.S. Pat. Nos. 4,261,749 and 4,280,939.

SUMMARY OF THE INVENTION

We have now found that these and other objectives can be accomplished through the preparation and use of thermoplastic inks in the nature of high viscosity, tacky pastes having particularly defined formulations. Thermoplastic inks overcome the problems incumbent with solvent-containing inks since, by their very nature, they undergo an increase in viscosity upon a reduction in temperature. Nevertheless, the conventional thermoplastic printing inks are ill-suited for collector processes because such cannot be transferred, when in the cooled state, between successive collector surfaces of varying surface energy levels merely upon the application of pressure. Hence, it has been found necessary for the ink to exhibit high tack and cohesive strength when cooled upon the first offset surface to a solid or semisolid (high viscosity) state. Thus, sufficient tack is demanded to cause adherence to subsequent transfer surfaces upon contact therewith, and, yet, sufficient cohesive strength must be inherent in the ink to permit the transfer thereof as an integral film from one surface to another.

Tack can be considered as a measure of pressure sensitivity which has been defined as the facility of a material to form an adhesive bond to a surface simply upon the application of pressure. Fundamentally, then, the printing inks must function as pressure sensitive adhesives to be operable in a collector process. The inks form an adhesive bond to the various surfaces merely upon the application of pressure, but they can be totally transferred between surfaces where their intrinsic cohesive strength is greater than the adhesive bond developed to at least one of the two surfaces involved. Materials commonly employed as hot melt or thermoplastic printing inks do not exhibit significant pressure sensitivity but, rather, such inks normally display wax-like properties.

In sum, printing inks must be properly formulated to demonstrate pressure sensitivity. We have produced such inks by combining certain, preferably amorphous organic polymers or copolymers with amorphous regions, with low molecular weight tackifying resins and plasticizers. The primary purpose of the plasticizers is to adjust melt viscosity, but, where carefully selected, they can also be useful in enhancing the level of tack. We have further found that low-to-medium molecular weight polymers are to be preferred, since higher molecular weight polymers impart undesirable rheological properties to the inks. The melt viscosity of the ink is a critical parameter thereof. For example, a high viscosity will not permit satisfactory wetting of surfaces having low surface energies with the consequence that a precise mirror image of a design on a first offset surface will not be created. On the other hand, a low viscosity commonly correlates with low cohesive strength such that an ink design will not completely transfer as an integral film between successive surfaces due to the inherent cohesive strength of the ink film being lower than the adhesive bond to both surfaces. As can be appreciated, incomplete transfer results in significantly reduced print quality and, further, may cause color cross contamination.

The inks of the present invention exhibit a very unique combination of properties; that is, extraordinarily high cohesive strength, high pressure sensitivity at low temperatures, high thermal stability, and low affinity to silicone surfaces. These properties enable the inks to be readily transferred between surfaces for which they have differing degrees of affinity, and render such transfers relatively unaffected by a time delay between pick-up and release. Further, they permit release of the ink from the transferring surface with much greater ease than any currently available formulation.

This advantage is especially significant in the type of offset process which utilizes a silicone collector upon which a multicolor print is formed, and from which the completed multicolor decoration is subsequently transferred to the ware. This situation appertains for the process wherein transfer to the ware immediately follows formation of the multicolor print, for the process wherein transfer is to a water soluble coating on paper to constitute a water-slide-off decalcomania, for the process wherein the transfer is to wax-coated paper to constitute a heat-release decalcomania, and for the process wherein the transfer is to silicone-coated paper to constitute a pressure or cold-release decalcomania. In all practices, it is highly desirable to have inks demonstrating as high a cohesive strength, as high a pressure sensitivity, and as low a deterioration rate on the transfer surface as possible in order to facilitate complete ink release from one silicone surface to the other.

Moreover, it has been found that the silicone surface deteriorates physically and the surface energy increases with repeated release cycles. The ink, then, fails to transfer in a complete fashion, but rather tends to either split itself due to insufficient strength, or to remain on the transferring surface. Therefore, the slower rate of deterioration of the silicone, the ability to release from higher energy surfaces, and the extraordinarily high cohesive strength of the present inventive ink formulations lead to a much longer release life of the ink-silicone system than with any other systems previously available.

Most of the inventive ink formulations offer another advantage over prior, pressure-sensitive, thermoplastic inks for glass decorations. The permanent and high pressure sensitivity at room temperature and under water renders the inks adaptable to water-slide-off decalcomania in conjunction with a paper that is coated with a water soluble layer. The inks in U.S. Pat. No. 4,261,749, being water soluble, were unsuitable for such applications.

In summary, to perform satisfactorily in a collector process, a hot melt or thermoplastic ink must manifest a defined minimum level of tack and cohesive strength and a melt viscosity within a critically-delineated range. Thus, the minimum tack requirement is 100 grams when measured at room temperature (75° C.) and 50% relative humidity on a Polyken probe tack tester, Model TMI480-2, utilizing a 0.5 cm diameter probe, a contact pressure of 230 grams/cm$^2$, a contact dwell period of 1 second, and a separation speed of 1 cm/second. (The Polyken probe tack tester is marketed by Testing Machines, Inc., 400 Bayview Avenue, Amityville, N.Y.) Inks demonstrating tack values less than 100 grams will not function desirably in a double offset system, with the most preferred values being in excess of 1000 grams.

The cohesive strength of the ink must be sufficiently great such that, if molten ink is applied between a glass, glass-ceramic, ceramic, or steel surface and a collector surface (normally a silicone elastomer), the ink will remain essentially completely on the glass, glass-ceramic, ceramic, or steel surface when the two surfaces are separated from each other after cooling to equilibrium at room temperature. In fact, it is quite desirable that the cohesive strength characteristics of the ink be such as to permit complete transfer at elevated temperatures, preferably up to about 150° F.

Finally, in addition to the requirements of cohesive strength and tack, the ink melt must exhibit a viscosity within a specifically limited range. As tested on a Brookfield Thermosel viscometer at 200° F. and 100 rpm (Spindle No. 29), the operable melt viscosity range lies between about 100–1000 poises. Optimum performance for most of the inventive inks is generally observed between about 350–650 poises.

For utility in ceramic applications, it is desirable for the organic components to burn out at firing temperatures in the region of 300°–750° C. Concomitantly with that capability, however, the organic components must be stable in the offset process operation temperature range of about 180°–300° F. Accordingly, thermally unstable organic materials or organic materials of very low molecular weight (<200) are generally unsuitable.

Therefore, the present invention is directed to the preparation of a pressure sensitive hot melt ink which exhibits a melt viscosity at 200° F. between about 100–1000 poises, as measured with a Brookfield Thermosel viscometer at a shear rate of 25 sec.$^{-1}$, a tack value of at least 100 grams as measured with a Polyken probe tack tester at 75° F. and 50% relative humidity utilizing a 0.5 cm diameter probe, a contact pressure of 230 grams/cm$^2$, a contact dwell period of 1 second, and a separation speed of 1 cm/second, and a cohesive strength of sufficient magnitude such that, when the molten ink is applied between a glass, glass-ceramic, ceramic, or steel surface and a silicone or other elastomer surface, the ink will remain essentially completely on the glass, glass-ceramic, ceramic, or steel surface when the two surfaces are separated from each other after cooling to room temperature.

Inks satisfying those criteria can be prepared from a formulation consisting essentially, in weight percent, of:

(a) about 50-80% of a vitrifiable, inorganic flux containing up to about 50% of inorganic pigments and opacifiers;

(b) about 2-20% of a cohesive strength imparting polymer with an average molecular weight between 10,000-200,000, wherein said polymer is selected from the group of ethylene copolymers with vinyl esters or vinyl acids, polyalkyl acrylate, polyalkyl methacrylate, polyalkyl acrylate or polyalkyl methacrylate or styrene copolymers with acrylic or methacrylic acid, styrene block copolymers with butadiene, cellulosic ethers, amorphous polyolefins, polyvinylpyrrolidone, polyethers, and polyesters;

(c) about 5-25% of a plasticizer with an average molecular weight between 200-5000 which is compatible with said polymer selected from the group of alkylene glycol or glycerol esters of monocarboxylic acids, alkyl alcohol esters of mono-, di-, and tricarboxylic acids, polyesters of dicarboxylic acids and polyols, polyalkylene glycols, glyceryl triepoxy acetoxy stearate, polybutene, mineral oil, and epoxidized vegetable oils;

(d) about 2-20% of an amorphous tackifying resin with an average molecular weight between 500-10,000 and a ring and ball softening point between 35°-115° C. selected from the group of hydrocarbon resins, terpenes, phenolics, rosin, and rosin derivatives; and, optionally, (e) up to about 20% of an organic wax having a ring and ball softening point less than about 100° C., this material being useful in regulating pressure sensitivity of the ink at temperatures below the softening point thereof.

Particularly desirable organic polymers include ethylvinyl acetate, ethyl methacrylate, and an amorphous polyolefin selected from the group of polyisobutylene and atactic polypropylene. A particularly desirable rosin derivative for an amorphous tackifying resin is an ester derivative of hydrogenated rosin, the most preferred rosin derivative being selected from group of glycerol ester and pentaerythritol ester.

GENERAL DESCRIPTION

Many of the present inks are referred to as pastes because they do not retain form permanently at ambient temperature unless supported. However, their viscosity at such temperature is so high that movement in the unsupported state is imperceptibly slow. Thus, a noticeable flow occurs only in a matter of hours.

As the material is heated to temperatures in the range of 180°-300° F. for printing, the ink becomes relatively fluid with a viscosity in the range of 100-1000 poises. Once applied to either an offset surface or to ware the ink almost instantly stiffens on cooling and retains the printed form with high fidelity. Hence, the inks exhibit thermoplastic behavior, although not being true solids.

The inks disclosed in U.S. Pat. No. 4,261,749 are also high viscosity, tacky pastes. Therefore, reference is made to that patent for further discussion of such inks and their characteristics.

A unique combination of properties renders the present inks especially effective for vitreous surface decorating. This is a combination of high tack and high cohesive strength, while maintaining low affinity for an elastomeric surface, especially a silicone. The high tack manifests itself in a strong affinity for, and adhesion to, a metal or vitreous surface. Cohesive strength concerns internal, rather than external, affinity. With low cohesive strength, there is a tendency for an ink to split internally and fail to transfer cleanly and completely from one surface to another. Low affinity for the transfer material is also essential for a clean transfer.

It is apparent that one key condition to obtain in an ink is a large differential between ink affinity for the ware surface and affinity for the transfer elastomer, especially a silicone. In other words, the affinity of the ink for the silicone or other transfer member should be kept low while being as high as possible for the ware. The condition may be considered in terms of pressure sensitivity. This property embodies the tack or affinity of the ink for the ware and the cohesive or internal strength of the ink. Thus, an ink that has high tack and high cohesive strength requires lower pressure for transfer and is referred to as having high pressure sensitivity at transfer temperatures.

We have further found that the high pressure sensitivity of the present inks provides a further distinct advantage when using a silicone collector and/or transfer member. This advantage is manifested in longer periods of printing service before equipment change or repair is required. In terms of both material cost and downtime, this is a very significant economic factor.

The present inks, like prior glass decorating inks, are heavily loaded with inorganic colorant, typically a glass flux containing pigments and opacifiers. Thus, the total inorganic content is 50 to 80% by weight of the ink with up to 50% thereof being pigment and opacifier additions. The inorganic materials contemplated are those known in the art and readily available from ceramic color manufacturers. It is generally desirable that they be finely comminuted, preferably to an average particle size less than 20 microns. This may be accomplished by ball milling in a suitable vehicle such as an alcohol.

The most preferable cohesive strength imparting polymer useful in the present inventive inks is an amorphous acrylic polymer. This polymer is effective in achieving a superior degree of thermal stability at processing (printing) temperatures. For example, the acrylic resins used in the present inks exhibit good stability up to 300° F. (150° C.), but still can be adequately removed in the normal ceramic firing cycle in air. In contrast, polyvinyl pyrrolidone (PVP), the preferred water soluble polymer for the tacky paste inks of U.S. Pat. No. 4,261,749, tends to oxidize as low as 225° F. (108° C.). Another valuable characteristic exhibited by acrylic polymers is their chemical polarity. Silicone surfaces tend to be relatively non-polar. We have found that the effectiveness of an ink increases with its polarity. Hence, as the polarity of an ink increases, the affinity for a silicone or other non-polar transfer member diminishes. In turn then, the ink releases more easily from the member and permits a clean transfer with less pressure. Preferably, the alcohol ester is an ethyl methacrylate having a molecular weight of about 30,000.

As has been explained above, to maintain satisfactory ink transfer from one surface to another it is necessary for the cohesive strength of the ink to exceed its adhesive strength (affinity) for at least one, and preferably both, surfaces. It is, of course, also necessary that adhesion to the receiving surface exceed adhesion to the transferring surface. It has been found that the surface energy of a silicone surface increases with increasing release cycles. Eventually then, its affinity for the ink can either exceed the cohesive strength of the ink, resulting in splitting of the ink film, or exceed the affinity for the receiving surface, thereby resulting in non-transfer. For maximum release life, therefore, it is necessary to have an ink which exhibits low initial affinity for the transferring silicone, thereby resulting in minimal deterioration of the silicone surface with increasing release cycles, and which also exhibits a high cohesive strength.

We have found that the use of acrylic resins, particularly when coupled with relatively high polar plasticizers as modifiers, significantly extends the printing life of a silicone surface. The present acrylic inks are superior to those disclosed in U.S. Pat. No. 4,280,939 in terms of low affinity and minimal silicone deterioration. They are superior to those disclosed in U.S. Pat. No. 4,261,749 in terms of high cohesive strength. It is this combination of properties which results in longer printing life for the ink-silicone system.

In selecting a modifying plasticizer, and also a wax in case one is used, there are four general criteria to consider. The material must be compatible with the resin system. It must be thermally stable at printing temperatures, which includes a low tendency to volatilize below 300° F. (150° C.). It must yield a low ink viscosity at printing temperatures. Finally, it must burn out in air in a satisfactory manner.

Numerous modifying plasticizers are available, as indicated. Among the alkyl alcohol esters of carboxylic acid are the di-phthalates, glutarates, adipates, azelates, sebacates, and trimellitates. Among the polyesters of dicarboxylic acids, a glutaric acid polyester with a molecular weight of one to five thousand is especially useful. If a polyalkylene glycol is employed, a polypropylene glycol having a molecular weight of about 400 is preferred.

Moreover, there are further criteria to consider when selecting the modifying plasticizer. Whenever resin compatibility considerations permit, the polarity of the plasticizer should be relatively high to exhibit low affinity for silicone rubbers, and the plasticizer should impart sufficient pressure sensitivity to the formulated ink. The choice of modifying plasticizer has a profound effect on pressure sensitivity of the ink. Thus, some plasticizers may have a strong positive effect on the pressure sensitivity of an ink, while others may impart little or no improvement. For example, an alkylene glycol ester of monocarboxylic acid, such as diethylene glycol dibenzoate, may provide very high pressure sensitivity, as illustrated below in Example 1 of Table I, whereas another plasticizer such as dioctyl sebacate, may not be effective in providing pressure sensitivity. As was observed above, the degree of pressure sensitivity exhibited by a material can best be ascertained in terms of tack and one useful instrument for measuring tack is identified as the Polyken probe tack tester, Model TMI 480-2. A particular ink to be tested for tack is placed, while in the heated molten state, on a glass sheet having circular depression therein of 0.875" diameter and 0.025" depth. Any excess ink is removed from the glass sheet with a steel doctor blade, leaving ink in the circular recess only. The ink sample is cooled to room temperature (75° F.) before testing. The Polyken probe tack tester quantifies the tack by measuring the force in grams necessary to separate the probe from the surface of the test specimen.

Plasticizers exhibiting high levels of tack, when utilized with an ethyl methacrylate polymer, include diethylene glycol dibenzoate, diisodecyl phthalate, and an alkyl phthalate mixture available from Monsanto under the mark Santicizer 711. An epoxidized vegetable oil also yeilded a high tack value, whereas glutaric acid polyesters having molecular weights from about 1000-5000 manifested low-to-medium levels. Another plasticizer which provides somewhat low, but yet useful, tack is glyceryl triepoxy acetoxy stearate.

If a wax is included in a formulation, it may, for example, be selected from animal and vegetable waxes, fatty acids and alcohols, fatty acid esters, glycerides and hydrogenated oils. The preferred wax is acetylated monoglyceride, although fatty alcohols, such as octadecanol and eicosanol, are quite effective. It is generally preferred that the wax exhibit a melt point below 212° F. (100° C.).

An amorphous, resinous tackifier is also desirably included. Its function is generally to increase the tack of the ink as discussed earlier. Most suitably, wood rosin or an ester derivative, such as a glycerol or pentaerythritol ester, is employed for this purpose. Other classes of tackifying resins, such as polyterpenes and thermoplastic phenolics, are also operable.

Other modifying components commonly used in preparing glass decorating materials and adhesives, such as dispersants, anti-oxidants, and defoamers, may be utilized in the present inks in a total amount commonly not exceeding about 5%.

PRIOR ART

U.S. Pat. No. 4,014,845 discloses a coating system designed for use in microelectronic applications. Because of that proposed utility, the coatings disclosed required specific properties. Thus, the patented coating system was comprised of two principal components, viz., an organic polymeric material which is a solid at ambient or room temperature, i.e., about 40°-120° F., and is capable of pyrolyzing in a non-oxygen containing atmosphere, and an organic vehicle which is a solvent for the polymeric material and has the capability of being removed (volatilized away) at a temperature below the pyrolyzing temperature of the polymeric material. In forming the patented coating, the solid polymeric material is dissolved in the fugitive organic vehicle, the mixture applied to a substrate, the coated substrate first fired at a slightly elevated temperature to remove the solvent and then fired at a sufficiently high temperature to pyrolyze the polymeric material. The firing will conventionally be undertaken in an inert environment such as nitrogen or argon. Hence, the polymeric material is selected such that it will pyrolyze in a non-oxygen containing environment at about 250°-450° C. without leaving a carbonaceous residue.

Because of their proposed utility, several features distinguish the patented materials from the hot melt inks of the instant invention. For example, the patent makes no mention of cohesive strength requirements, viscosity requirements, or tack requirements to be demonstrated by the patented coatings. And most importantly, the patent does not even remotely allude to the need for the coating to be melt processible and to exhibit very low affinity for silicone or other elastomeric surfaces.

The only reference to plasticizers to be gleaned from the patent is the optional use thereof as solvents for the polymeric materials to achieve a solvating effect therefrom; there is no disclosure in the patent of the necessity for selecting a plasticizer which will exert a desirable effect upon the pressure sensitivity of the final ink formulation. Furthermore, there is no description in the patent of the need for including an amorphous, resinous tackifier in the formulation to increase tack thereof.

The simple combination of a resin and solvent is selfevidently well known technology. The patent discloses combinations thereof wherein the solvent volatilizes away at about 100°-400° C., leaving the resin which pyrolyzes at a higher temperature in a non-oxygen containing atmosphere. In contrast, the inventive inks are fired in an oxidizing atmosphere, viz., air, and comprise a specific combination of resin, plasticizer, and tackifier which will exhibit permanent pressure sensitivity at room temperature, very high cohesive strength, good melt processibility, and a minimum tack characteristic. Because of their very low affinity for silicone surfaces, the inventive inks cause very little degradation of such surfaces, thereby permitting long silicone release lives when employed as hot melt printing inks.

British Patent Application No. 2,085,805 discloses printing media assertedly useful for decorating ceramic articles with silicone transfer members. The media are stated to be fluid at temperatures of 40°-80° C., are capable of forming a coherent film on a silicone member, are non-tacky at room temperature, and release completely therefrom to solidify as a non-tacky coating on an article to be decorated. Basically, the media consist of a thermoplastic resin and a rheology-controlling diluent.

The preferred thermoplastic resin is selected from the group of cellulose ethers, styrenes, terpenes, methacrylates, rosins, modified rosins, and rosin esters.

The rheology-controlling diluent is selected from the group of liquid resins, high molecular weight esters, fatty alcohols, and saturated fatty acids. Suitable liquid resins are said to include triethylene glycol ester of rosin, hydrogenated methyl ester of rosin, low molecular weight (300-400) styrene resin, and polyterpene derived from alphapinene. Suitable high molecular weight esters are stated to be selected from materials having melting points of 25°-50° C. including palmitates, stearates, diethoxyethyl phthalate, dibenzl phthalate, neopentyl glycol dibenzoate, and triethylene glycol dibenzoate. The preferred fatty alcohols have 12-18 carbon atoms in the chain with myristyl alcohol, cetyl alcohol, and stearyl alcohol being specifically mentioned. The fatty acids will have 10-18 atoms in the chain with capric acid, lauric acid, and myristic acid being specifically mentioned.

Preferably, the media consist of 30-98% thermoplastic resin and 2-70% diluent and two or more thermoplastic resins are preferably employed, at least one resin having a softening point between 105°-170° C. and another resin having a softening point between 5°-90° C.

A fundamental distinction that can be drawn between the disclosed media and the present inventive inks resides in the fact that the latter are specifically formulated to demonstrate high pressure sensitivity (tack) at room temperature. Stated differently, because the present inventive inks are designed to be utilized with a double offset or collector process, they are explicitly and purposefully formulated to exhibit high pressure sensitivity at low temperatures. The inks of the British patent application do not display that property and, consequently, would not be suitable for the Applicant's requirements.

Other distinctions existing between the disclosed media and the instant inventive inks, and disadvantages inherent in the disclosed inks, can be recognized. For example, the referenced inks are dependent upon wax solidification as the mechanism for transferring the inks as integral films. Furthermore, the disclosed media are very sensitive to thermal conditions. This factor is underscored through emphasis that the referenced inks must solidify upon transfer in order to effect complete release. However, because of that factor, if the media are allowed to cool to solidify upon a transfer surface, they cannot be transferred from that surface. On the other hand, if the media are still fluid, they do not demonstrate sufficient cohesive strength to permit transfer of an integral film. Consequently, the disclosed media are very sensitive to both the time delay between pickup and transfer, as well as the transfer and ware temperatures. Accordingly, the referenced media would be totally inoperable in an offset or collector printing process inasmuch as they could not be transferred from the collector upon the simple application of pressure.

DESCRIPTION OF THE PREFERRED EMBODIMENTS

Table I reports several formulations, in parts by weight, of inks illustrating the desired characteristics. The pigmented glass flux materials were premilled with a dispersant in an alcohol solvent to an average particle size of less than about 20 microns. The organic constituents were heated to a molten state and the flux component blended therewith. The mixing was continued until the alcoholic solvent was evaporated away and a homogeneous mixture obtained. In general, the inventive inks will be fired to a peak temperature of about 700°-900° C.

The values of tack recorded in Table I were ascertained utilizing a 0.5 cm diameter probe with a 280 grit polished face, a contact pressure of 30 grams/cm$^2$, a contact dwell period of 0.5 second, and a separation speed of 5 cm/second. For use in a silicone collector printing process, it is highly desirable that the ink demonstrate tack levels in excess of 200 grams when tested under these conditions. Inks with values of less than 20 grams, when tested in like manner, are generally inoperable.

TABLE I

|  | 1 | 2 | 3 | 4 | 5 |
| --- | --- | --- | --- | --- | --- |
| Pigmented Glass Flux | 240 | 240 | 240 | 160 | 240 |
| Ethyl Methacrylate (M.W. ~30,000) | 30 | 30 | 30 | 30 | 30 |
| Rosin, Glycerol Ester | 45 | 45 | 45 | — | 45 |
| Diethylene Glycol Dibenzoate | 45 | — | — | 25 | 30 |
| Diisodecyl Phthalate | — | 45 | — | — | — |
| Epoxidized Vegetable Oil | — | — | 45 | — | — |
| Acetylated Monoglyceride | — | — | — | 25 | — |
| Fatty Alcohol Wax | — | — | — | — | 15 |
| Pressure Sensitivity at 75° F. in Grams | 510 | 470 | 580 | 50 | 250 |

In the compositions above, the ethyl methacrylate was a material supplied by E. I. duPont de Nemours under the designation Elvacite 2043; the glycerol ester rosin was a material supplied by Arizona Chemical Co., Wayne, N.J., under the name Zonester 55; the diethylene glycol dibenzoate was obtained from Velsicol Chemical Corp., Chicago, Ill. under the name Benzoflex 2-45; the epoxidized vegetable oil was obtained from Argus Chemicals Corp., Brooklyn, N.Y. under the name Drapex 10.4; the acetylated monoglyceride was a product of Eastman Chemicals, Kingsport, Tenn., sold under the name Myvacet 5-07.

Each of the above compositions demonstrates very high cohesive strength and permanent pressure sensitivity which can be varied somewhat to suit the process wherein employed.

Formulations 1, 2, 3, and 5 exhibit high pressure sensitivity, and are thereby perfectly suited for the offset collector printing processes described in the Ford-Johnson application, Ser. No. 173,129 mentioned earlier. These formulations are also suited for pressure-release-type decalcomania, when used in conjunction with a two-sided, silicone-coated release paper. Such a double-sided release paper should exhibit a lesser affinity for the ink on the back side than on the front side. This insures that the decorating pattern will stay on the front, without transfer to the back, when the paper is rolled up for storage. Formulation 4 is particularly suited for the preparation of heat-release decalcomania, wherein a silicone release coating is on the back side of the wax paper, again to prevent transfer during storage.

The processes most suited for the above inks utilize an offset elastomeric roll, commonly composed of a silicone rubber. This roll picks up molten ink from a heated, etched surface, or screen, such as an intaglio printing roll. The inks then cool upon the elastomeric roll to a temperature where they develop adequate integrity and pressure sensitivity to enable their transfer. This transfer, solely by intimate contact, is from the offset roll to the surface of a body for which the inks have greater affinity. This body is customarily an article of glass, glass-ceramic, or ceramic ware. However, it may also be decal paper. It may also be a second elastomer, conventionally called a collector, upon which a multicolor design is built up through successive transfers from several offset elastomers. The completed, multicolored image on the collector elastomer can be transferred, either to an article of glass, glass-ceramic, or ceramic ware or to a wax paper utilized in heat-release-type decals, by placing the collector into contact therewith. The collector can be a roll, a pad, a thin sheet, or silicone-coated release paper. In this latter instance, the multicolored print constitutes a pressure-release decal.

Table II recites a further group of ink formulations, expressed in terms of parts by weight, illustrating useful ingredients for the inventive inks. Preparation of the inks was carried out in like manner to the examples recorded in Table I. That is, the pigmented glass flux materials were premilled with a dispersant in an alcohol solvent to an average particle size of less than about 20 microns, the organic components were melted, and the flux materials were blended therewith, the mixing being continued until the alcoholic solvent was vaporized off and a homogeneous mixture was obtained. In like manner to the examples of Table I, the cited inks will generally be fired to a peak temperature of about 700°–900° C.

The viscosity values listed in Table II were measured utilizing a Brookfield Thermosel viscometer operating at a shear rate of 25 sec$^{-1}$ at a temperature of 200° F. The levels of tack reported in Table II were ascertained at 75° F. and 50% relative humidity using a Polyken probe tack tester with a 0.5 cm diameter probe having a 280 grit polished face, a contact pressure of about 230 grams/cm$^2$, a contact dwell period of 1 second, and a separation speed of 1 cm/second.

Table III correlates the trade names of the ingredients employed as components in the ink formulations recited in Table II with the chemical type and supplier of each. Table III also characterizes two specific organic chemicals utilized as ink constituents.

Tack values must be determined under precise conditions for good reproducibility of measurements. The test conditions utilized in obtaining the values set forth in Table II are preferred over those employed in ascertaining the measurements recorded in Table I. The test conditions of Table II yield tack values approximately three times those reported for the test conditions of Table I.

TABLE II

| Material | 6 | 7 | 8 | 9 | 10 | 11 | 12 | 13 | 14 | 15 | 16 | 17 |
|---|---|---|---|---|---|---|---|---|---|---|---|---|
| Pigmented Glass Flux | 926 | 610 | 764 | 540 | 1486 | 776 | 880 | 780 | 804 | 816 | 880 | 940 |
| Elvax 420 | 100 | — | — | — | 100 | — | — | — | — | — | — | — |
| R500 | 60 | — | — | — | — | — | — | — | — | — | — | — |
| Vistanex LM-MS | — | 100 | — | — | 60 | — | — | — | — | — | — | — |
| Elvacite 2043 | — | — | 100 | — | — | 100 | — | — | 100 | 100 | — | — |
| PVP 1230 | — | — | — | 100 | — | — | — | — | — | — | — | — |
| Escorez 1304 | 160 | — | — | — | 160 | — | — | — | — | — | — | — |
| Drakeol 35 | 102 | — | — | — | — | — | 240 | — | — | — | — | — |
| Zonarez 7100 | — | 100 | — | — | — | — | — | — | — | — | — | — |
| Triisooctylmellitate | — | 105 | — | — | — | — | — | — | — | — | — | — |
| Zonester 55 | — | — | 150 | — | — | 150 | — | — | 150 | 150 | 100 | 100 |
| Benzoflex 2-45 | — | — | 132 | — | — | — | — | — | — | — | — | — |
| PEG 400 | — | — | — | 85 | — | — | — | — | — | — | — | — |
| Myvacet 5-07 | — | — | — | 85 | — | — | — | — | — | — | — | — |
| Indopol H-50 | — | — | — | — | 375 | — | — | — | — | — | — | — |
| Ethocel Std 4 | — | — | — | — | — | — | — | — | — | — | 100 | 100 |
| Solprene 1205 | — | — | — | — | — | — | 100 | — | — | — | — | — |
| Joncryl 67 | — | — | — | — | — | — | — | 100 | — | — | — | — |
| Staybelite | — | — | — | — | — | — | 100 | 100 | — | — | — | — |
| Dioctyl Phthalate | — | — | — | — | — | 138 | — | — | — | — | — | — |
| Plasthall P-550 | — | — | — | — | — | — | — | — | 152 | — | — | — |
| PEG 600 | — | — | — | — | — | — | — | 190 | — | — | — | — |
| Estynox 308 | — | — | — | — | — | — | — | — | — | — | — | 270 |
| Drapex 10.4 | — | — | — | — | — | — | — | — | — | 158 | — | — |
| Neobee 0 | — | — | — | — | — | — | — | — | — | — | 240 | — |
| Alfol 20 | 41 | — | — | — | 48 | — | — | — | — | — | — | — |

TABLE II-continued

| Material | 6 | 7 | 8 | 9 | 10 | 11 | 12 | 13 | 14 | 15 | 16 | 17 |
|---|---|---|---|---|---|---|---|---|---|---|---|---|
| Viscosity (Poises) | 390 | 510 | 480 | 320 | 440 | 530 | 890 | 250 | 510 | 560 | 550 | 430 |
| Tack (Grams) | 264 | 920 | 1560 | 530 | 630 | 1495 | 210 | 1140 | 1470 | 1750 | 190 | 720 |

TABLE III

| Name | Chemical Type | Supplier |
|---|---|---|
| Elvax 420 | ethylene vinyl acetate | E. I. du Pont de Nemours Company |
| Vistanex LM-MS | polyisobutylene | Exxon Chemical Company |
| Elvacite 2043 | alkyl methacrylate | E. I. du Pont de Nemours Company |
| Ethocel Std 4 | ethyl cellulose | Dow Chemical Company |
| Solprene 1205 | styrene-butadiene copolymer | Phillips Petroleum Company |
| Escorez 1304 | hydrocarbon resin | Exxon Chemical Company |
| Staybelite | hydrogenated rosin | Hercules Incorporated |
| Zonester 55 | glycerol ester of rosin | Arizona Chemical Company |
| Zonarez 7100 | terpene resin | Arizona Chemical Company |
| Benzoflex 2-45 | alkylene glycol ester of monocarboxylic acid | Velsicol Chemical Company |
| Neobee O | glycerol ester of monocarboxylic acid | PVO International Inc. |
| Plasthall P550 | polyester | The C. P. Hall Company |
| PEG 400 | polyalkylene glycol | Union Carbide Corporation |
| PEG 600 | polyalkylene glycol | Union Carbide Corporation |
| Drapex 10.4 | epoxidized vegetable oil | Argus Chemical Corporation |
| Myvacet 5-07 | acetylated monoglyceride | Eastern Chemicals |
| PVP 1230 | polyvinyl pyrrolidone | GAF |
| Estynox 308 | glyceryl triepoxy acetoxystearate | National Laboratories Corporation |
| Drakeol 35 | mineral oil | Penreco |
| Indopol H-50 | polybutene | Amoco Chemical Corporation |
| Alfol 20 | fatty alcohol wax | Continental Oil Company |
| R500 | atactic (amorphous) polypropylene | Crowley Hydrocarbon Chemical Inc. |
| Joncryl 67 | styrene-acrylic acid copolymer | Johnson Wax |

| Specific Chemical | Chemical Type |
|---|---|
| Triisooctylmellitate | alkyl alcohol ester of tricarboxylic acid |
| Dioctyl phthalate | alkyl alcohol ester of dicarboxylic acid |

As can be appreciated, all of the formulations in Tables I and II do not perform equally well in the double offset or collector process. The best formulations therefor combine high values of tack and cohesive strength with minimal deterioration of the transfer surfaces (commonly a silicone) during process operation. That combination is particularly exemplified in Examples 8, 14, and 15. In contrast, Examples 9 and 13 demonstrate significantly lower levels of cohesive strength and, consequently, are more prone to be subject to incomplete transfer due to film splitting. Also, Examples 12 and 16 exhibit marginal values of tack and, accordingly, are more susceptible to incomplete transfer because of an inability to adhere to the receiving surface.

The critical levels of cohesive strength and tack, as well as viscosity, vary somewhat from formulation to formulation since those values are influenced by the chemical nature of the constituents comprising the ink formulation. For example, the characteristic of high polarity in an ink favors release from silicone surfaces and, therefore, a lower cohesive strength and viscosity can be tolerated in ink formulations of higher polarity. On the other hand, inks of lower polarity display better surface wettability of low surface energy silicone materials and, hence, a lower tack value can be tolerated in such ink formulations.

Furthermore, as would be expected, because of the different chemical nature of the exemplary inks, different silicone formulations are required for preparation of the collector surface. For examples, Example 6 and 10 demand a collector surface exhibiting a lower surface energy than Examples 8 and 9. This circumstance is due to the higher affinity of Exampes 6 and 10 for silicone than the latter formulations. An operable collector for Examples 6 and 10 is SWS Silicones 04478 with 20 parts per hundred 04478 base of 350 cs silioxane oil, while a satisfactory silicone collector surface for use with Examples 8 and 9 is Dow Corning Silastic L with 40 parts per hundred Silastic L base of 350 cs dimethyl siloxane oil.

The following example illustrates one embodiment of a double offset, collector printing process, utilizing inks of the present invention.

EXAMPLE

An intaglio printing roll was heated to about 180°-300° F. (82°-149° C.) and flooded with an inventive ink in the molten state. Excess ink was removed therefrom with a squeegee, or utilizing a doctor blade technique, leaving ink solely in the recessed design of the roll. The roll was thereafter brought into contact with a first silicone offset roll (unheated). The roll was composed of Dow Corning 3110 silicone, containing 40 phr (parts/hundred resin) of a low molecular weight silicone fluid, which was capable of being wetted by the molten ink. This first offset roll was thereafter moved away from the intaglio roll, causing the liquid ink in the recessed design to be split between the two surfaces. This created a mirror image of the design on the offset roll. The ink immediately cooled to form an integral, tacky pattern on the surface of the first offset roll. This film was then contacted by a second offset roll. This roll was made from a Dow Corning L, RTV silicone rubber, also containing 40 phr of a low molecular weight silicone oil, and which had an affinity for the ink intermediate to that of the first offset roll and the surface being printed. As the two offset rolls separated, the ink pattern transferred intact onto the second offset roll, customarily called a collector. The ink printed upon the surface of the collector roll possessed sufficient integrity that a second color could be applied thereover and/or in contiguous relation thereto. If desired, the transfer process to the collector could be repeated numerous times to apply a full spectrum of colors.

Upon completion of forming a multicolored print on the collector, the collector surface was moved into contact with the surface to be decorated, an article of glassware in this case. The decorating ink transferred, upon separation of the collector and ware, from the collector surface to the ware surface in the printed, multicolored pattern desired.

We claim:

1. A thermoplastic ink suitable for decorating glass, glass-ceramic, and ceramic articles by means of processes which utilize a silicone surface, said ink exhibiting high permanent pressure sensitivity at room temperature, thermal stability up to about 150° C., a low affinity to silicone surfaces, a viscosity at 200° F. of about 100–1000 poises, as determined at a shear rate of 25 $sec^{-1}$ with a Brookfield Thermosel viscometer, a tack value in excess of 600 grams, when measured with a Polyken probe tack tester at 75° F. and 50% relative humidity utilizing a 0.5 cm diameter probe, a contact pressure of 230 grams/$cm^2$, a contact dwell period of 1 second, and a separation speed of 1 cm/second, a cohesive strength of sufficient magnitude such that, when the molten ink is applied between a glass, glass-ceramic, or ceramic and a silicone surface, the ink will remain essentially completely on the glass, glass-ceramic, or ceramic surface when the two surfaces are separated from each other after cooling to room temperature, and being prepared from a formulation consisting essentially, in weight percent, of:

(a) about 50–80% of a vitrifiable, inorganic flux containing up to about 50% of inorganic pigments and opacifiers;

(b) about 2–20% of an amorphous polymer and/or copolymer with an amorphous region with an average molecular weight between 10,000–200,000 wherein said polymer and/or copolymer is selected from the group of polyalkyl acrylate, polyalkyl methacrylate, polyalkyl acrylate or polyalkyl methacrylate or styrene copolymers with acrylic or methacrylic acid, cellulosic ethers, amorphous polyolefins, polyethers, and polyesters;

(c) about 5–25% of a plasticizer compatible with said organic polymer and/or copolymer which enhances the level of tack, which has a low tendency to volatilize below 150° C., and has a molecular weight between 200–5000 selected from the group of alkylene glycol or glycerol esters of monocarboxylic acids, alkyl alcohol esters of mono-, di-, and tricarboxylic acids, polyesters of dicarboxylic acids and polyols, polyalkylene glycols, glyceryl triepoxy acetoxy stearate, polybutene, mineral oil, and epoxidized vegetable oils;

(d) about 2–20% of an amorphous tackifying resin with an average molecular weight between 500–10,000 and a ring and ball softening point between 35°–115° C. selected from the group of hydrocarbon resins, terpenes, phenolics, rosin, and rosin derivatives; and, optionally, (e) up to about 20% of an organic wax having a melt point less than 100° C. and a low tendency to volatilize below 150° C.

2. A thermoplastic ink according to claim 1 wherein said vitrifiable, inorganic flux has an average particle size less than 200 microns.

3. A thermoplastic ink according to claim 1 wherein said organic polymer is selected from the group of ethyl vinyl acetate, an ethyl alcohol ester of methacrylic acid, ethyl methacrylate, and an amorphous polyolefin selected from the group of polyisobutylene and atactic polypropylene.

4. A thermoplastic ink according to claim 1 wherein said amorphous tackifying resin is an ester derivative of hydrogenated rosin.

5. A thermoplastic ink according to claim 4 wherein said rosin is selected from the group of glycerol ester and pentaerythritol ester.

6. A thermoplastic ink according to claim 1 wherein said plasticizer is selected from the group of polypropylene glycol and alkyl alcohol ester of carboxylic acid selected from the group of di-phthalates, glutarates, adipates, azelates, sebacates, and trimellitates.

7. A thermoplastic ink according to claim 6 wherein said plasticizer is a dialkyl phthalate.

8. A thermoplastic ink according to claim 7 wherein said dialkyl phthalate is diisodecyl phthalate or dioctyl phthalate.

9. A thermoplastic ink according to claim 1 wherein said plasticizer is a glutaric acid polyester with a molecular weight of 1,000–5,000.

10. A thermoplastic ink according to claim 1 wherein the plasticizer is an alkylene glycol ester of monocarboxylic acid.

11. A thermoplastic ink according to claim 10 wherein said alkylene glycol ester of monocarboxylic acid is diethylene glycol dibenzoate.

12. A thermoplastic ink according to claim 1 wherein said wax is selected from the group of a fatty alcohol and acetylated monoglyceride.

* * * * *